Dec. 19, 1933.  R. BURTNETT  1,940,579

JOINT FOR CONCRETE AND SIMILAR PIPE

Original Filed Dec. 16, 1930  3 Sheets-Sheet 1

INVENTOR.
Robert Burtnett,
BY
George D. Richards
ATTORNEY.

Dec. 19, 1933.  R. BURTNETT  1,940,579
JOINT FOR CONCRETE AND SIMILAR PIPE
Original Filed Dec. 16, 1930   3 Sheets-Sheet 2
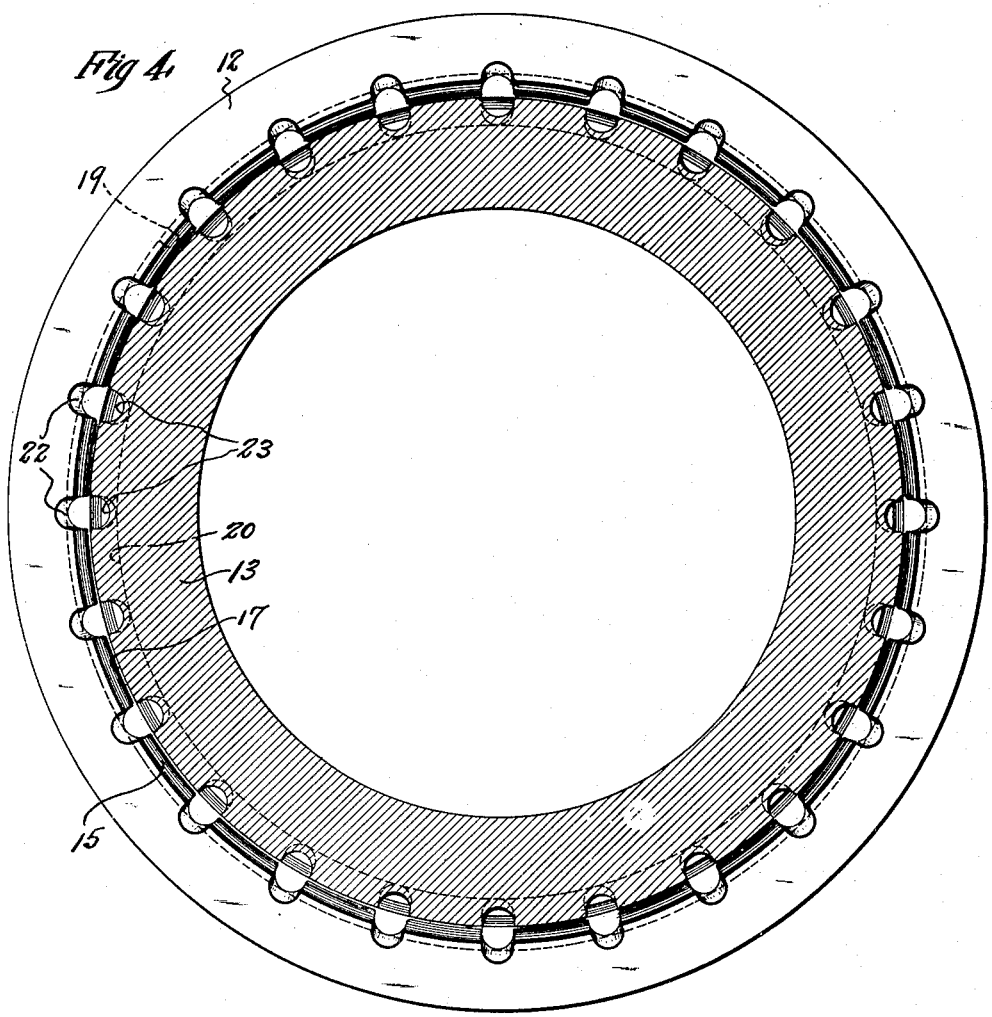
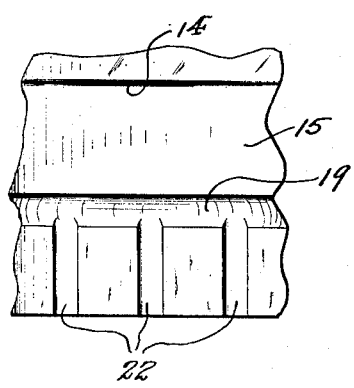
Fig. 5
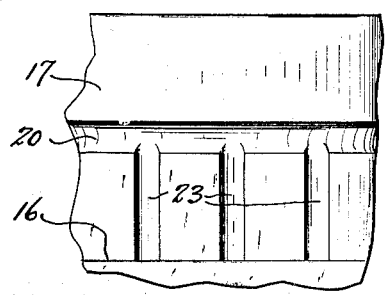
Fig. 6
INVENTOR.
Robert Burtnett,
BY
George D. Richards
ATTORNEY.

Dec. 19, 1933.   R. BURTNETT   1,940,579
JOINT FOR CONCRETE AND SIMILAR PIPE
Original Filed Dec. 16, 1930   3 Sheets-Sheet 3

INVENTOR.
Robert Burtnett
BY
George D. Richards
ATTORNEY.

Patented Dec. 19, 1933

1,940,579

UNITED STATES PATENT OFFICE 1,940,579

JOINT FOR CONCRETE AND SIMILAR PIPE

Robert Burtnett, Mount Vernon, N. Y., assignor to Pipe & Joint Improvement Co., Inc., Mount Vernon, N. Y., a corporation of New York Application December 16, 1930, Serial No. 502,703
Renewed June 7, 1933

2 Claims. (Cl. 285—115)

This invention relates to improvements in leak-proof joints for concrete vitrified and similar pipe; and the invention has reference, more particularly, to a novel self centering bell and spigot joint structure arranged to receive a novel joint closing compound in interlocked relation to the cooperating adjoined bell and spigot members of the joint.

The invention has for its principal object to provide a novel pipe joint structure comprising cooperating adjoined bell and spigot members so arranged as to be self-centering, and having their opposed faces in divergent annular planes to form an inwardly tapering joint compound receiving space, which at its outer end communicates with an annular mouth provided between the opposed shoulders of said bell and spigot members.

The invention has for a further object to provide in connection with said opposed faces of adjoined bell and spigot members annular retaining grooves or channels open to said main joint compound receiving space.

The invention also has for a further object to provide inlet grooves or channels in said opposed faces of adjoined bell and spigot members leading from annular mouth between the shoulders of the latter to said annular retaining grooves or channels.

The invention further contemplates the provision in the joint structure of a leak-proofing compound between the bell and spigot members, comprising a mixture of water emulsified asphalt and cement.

Other objects of this invention, not at this time more particularly enumerated, will be understood from the following detailed description of the same.

Illustrative embodiments of this invention are shown in the accompanying drawings, in which:—

Figure 1:
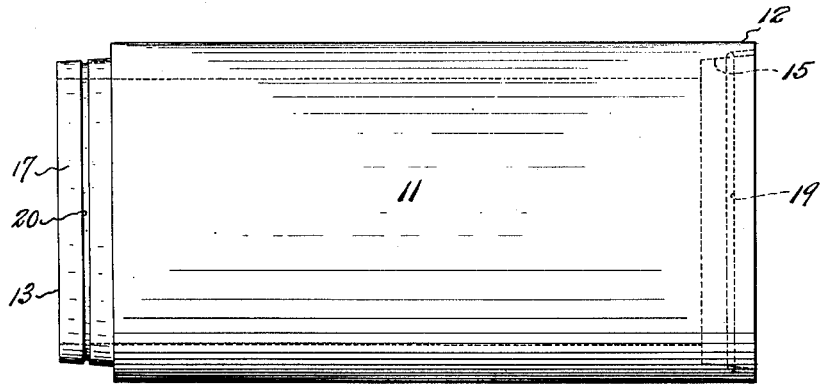
Figure 2:
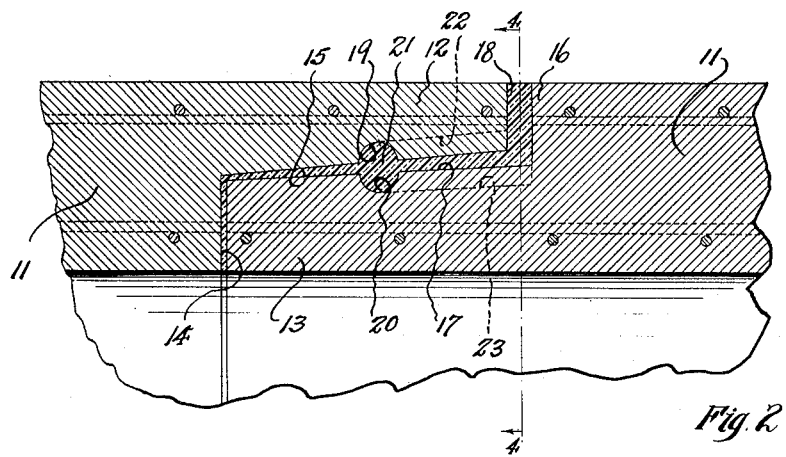
Figure 3:
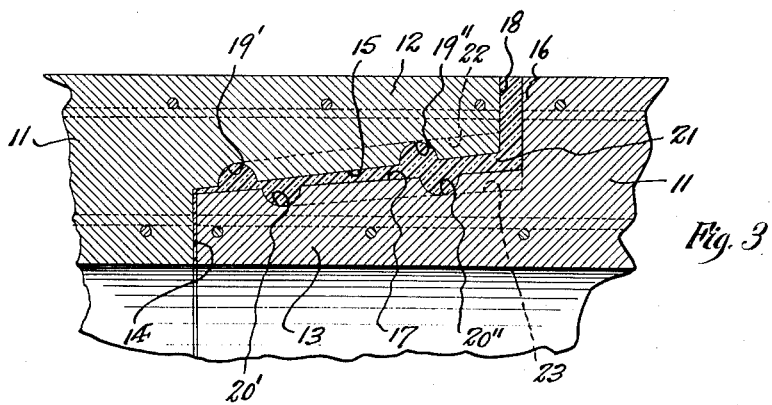
Figure 7:
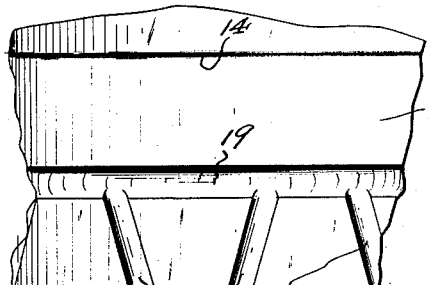
Figure 8:
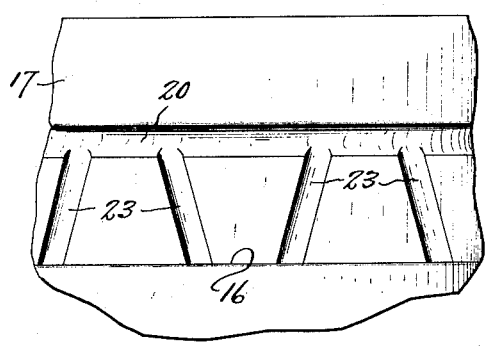

Fig. 1 is a side elevation of a pipe or conduit section provided with the novel bell and spigot ends made according to this invention; Fig. 2 is an enlarged fragmentary longitudinal section taken through the complete joint formed by cooperating bell and spigot ends of adjoining pipe or conduit sections; Fig. 3 is a view, similar to that of Fig. 2, but showing a modified arrangement of annular retaining grooves or channels in the opposed faces of the cooperating bell and spigot members; Fig. 4 is a transverse section through the joint, taken on line 4—4 in Fig. 2; Fig. 5 is a fragmentary inside face view of the bell member of the joint, and Fig. 6 is a similar face view of the spigot member of the joint; Fig. 7 is a view similar to that of Fig. 5, but showing a modified arrangement of inlet grooves or channels in the bell, and Fig. 8 is a view similar to that of Fig. 6, showing such modified arrangement of inlet grooves or channels in the spigot.

Figure 9:
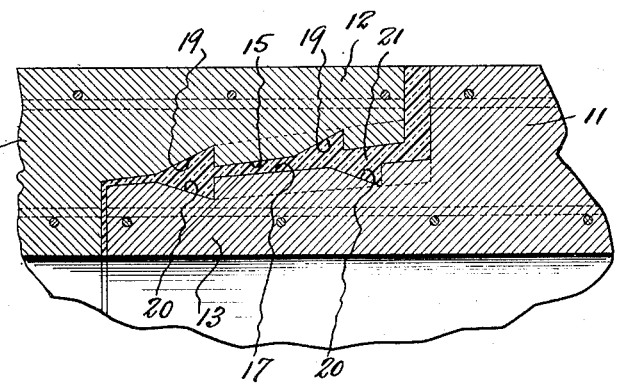
Figure 10:
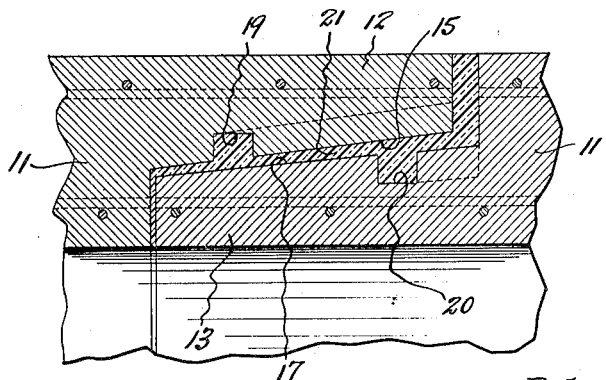

Figs. 9 and 10 are, respectively, views similar to that of Fig. 2, but showing modified forms and arrangements of annular retaining grooves or channels in the opposed faces of cooperating bell and spigot members.

Similar characters of references are employed in the above described views, to indicate corresponding parts.

Referring now to the drawings, the reference character 11 indicates a pipe or conduit section, which may be made of cast or molded concrete, or vitreous or other suitable material. Each section 11 is provided at one end with a bell member 12 and at its opposite end with a spigot member 13.

When two pipe or conduit sections are disposed end to end so as to be joined together, the spigot member 13 of one section is opposed to the bell member of the adjoining section, whereby the latter telescopically enters the former.

In the novel form of joint, embodying the features of this invention, the bell member is provided with an internal shoulder 14 at its base. The internal annular face 15 of the bell member is outwardly flaring or inclined. The spigot member is provided with an external shoulder 16 at its base, and is provided with an external annular flange 17 whch is inwardly tapered or inclined toward the free end of the spigot member. The external diameter of the free end of said spigot member is substantially equal to the internal diameter of the bell member at the juncture of the latter with the shoulder 14; whereas the internal diameter of the free end of said bell member is greater than the external diameter of the spigot member at a point adjacent to the juncture of the latter with the shoulder 16. By this arrangement the opposed faces 15 and 17 of the cooperating bell and spigot members converge within the bell portion in a self-centering fit, i. e., these parts will so mutually interengage at such point as to automatically bring adjoining pipe sections into axial alignment, when the spigot member of one is inserted telescopically into the bell member of the other; and when so engaged, the free end of the spigot member will abut the shoulder 14 of the bell member. The respective opposing faces 15 and 17 of the bell and spigot members, however, are of different angular planes so that they are divergent toward the free end of the bell member, such arrangement resulting in an inwardly tapering joint compound receiving space intermediate said opposed faces 15 and 17. The spigot member 13 is somewhat longer in its extension from the shoulder 16, than is the bell member 12 in its extension from the shoulder 14, and as a consequence of this, when the spigot member is entered within the bell member, an annular mouth 18 is provided intermediate said shoulder 16 and the free end of the bell member. Said annular mouth 18 extends inwardly into communication with the other end of the joint compound receiving space above described.

As shown in Fig. 2, formed in the face 15 of the bell member 12 is an annular retaining groove or channel 19, disposed between the end of the bell member and the shoulder 14. In like manner, formed in the face 17 of the spigot member 13 is a similar annular retaining groove or channel 20, likewise between the end of the spigot member and the shoulder 16. These retaining grooves or channels 19—20 may be so arranged as to be opposed to each other, when the bell and spigot members are assembled, as shown in Fig. 2. If desired a plurality of retaining grooves or channels may be employed, either in opposed or staggered relation. This is shown in Fig. 3 wherein the bell member possesses annular retaining grooves or channels 19' and 19'', and the spigot member possesses annular retaining grooves or channels 20' and 20''; said grooves or channels 20' and 20'' being, if desired, more or less off-set relative to the grooves or channels 19' and 19''. In Figs. 2 and 3 said retaining grooves or channels are shown in semi-circular cross-sectional form; it will be obvious, however, that the same may be of any other desired cross-sectional shape. For example, in Fig. 9, retaining grooves or channels 19 and 20 are shown of tri-angular cross-sectional shape; and in Fig. 10, said retaining grooves or channels 19 and 20 are shown of rectangular cross-sectional shape; the same being further shown in said Figs. 9 and 10 in variously relatively disposed positions, to illustrate some of the many possible variations of arrangement thereof within the spirit of this invention.

The novel construction of mutually engageable bell and spigot members above described is designed to provide a novel joint compound receiving space especially adapted to receive a plastic compound capable of being either troweled or flown thereinto while in a soft or somewhat liquid condition, but being further adapted to set or harden to form a non-brittle or elastic leak-proof bond between the engaged bell and spigot members. The novel plastic compound having such desired characteristics, comprises a mixture of water emulsified asphalt and cement. This compound may be variously modified as to its initial consistency, as working conditions require. For example, I have found a mixture comprising thirty per cent of cement, provides a good basic compound to which water may be added in the mixing to attain a consistency of soft putty. The joint compound of such consistency may be troweled on the opposed surfaces of the bell and spigot members as required, so that when engaging said members it will be compressed therebetween. Where, however, a more ductile joint is desired, the mixture may comprise up to fifty per cent of emulsified asphalt with down to fifty per cent of cement, which mixture may be thinned with added water so that it flows readily.

The joint compound, therefore, may be flown into the receiving space between the bell and spigot members through the mouth 18. If it is desired to grout the joint compound into position between engaged bell and spigot members, the compound may be readily thinned with water until it runs freely. It will thus be apparent that the compound lends itself readily to various methods of application, according to particular requirements or conditions surrounding the installation of pipe or conduit in any given case.

However applied the novel joint compound alone specified, and indicated in the drawings by the reference character 21, will readily fill the receiving space between the engaged bell and spigot, and will fill and interlock into the retaining grooves or channels 19—20, so that when set a tight leak-proof joint is provided, which, however, due to the elastic character of the compound, will not fracture or open up seams under stress or strains to which the laid pipe or conduit may be subjected, or under slight relative movements of adjoined pipe or conduit sections due to expansion and contraction thereof.

In order to facilitate adherence of the joint compound to the opposed surface of the interengaged spigot and bell members, it is sometimes advisable to fill the pores of said surfaces by coating the same with a preliminary surfacing of emulsified asphalt alone, prior to joining the spigot and bell members together and introducing the joint compound therebetween.

In order to facilitate the movement of the joint compound into the receiving space therefor and especially into the retaining grooves or channels 19—20, when flowing or grouting said compound into the joint, the bell member may be provided with a plurality of annularly spaced substantially longitudinally disposed inlet grooves or channels 22 extending from the mouth 18 at the end of the bell-member inwardly to the retaining groove or channel 19, and between the latter when a plurality thereof are employed. In like manner, the spigot member may be provided with a plurality of similar annularly spaced inlet grooves or channels 23 extending between the shoulder 16, and consequently the mouth 18, and the retaining groove or channel 20, and also between the latter when a plurality thereof are employed. In Figs. 5 and 6, said inlet grooves or channels 22 and 23 are shown strict longitudinal extension, but in Figs. 7 and 8, the same are shown in angular extension. The latter arrangement has some advantage in providing additional interlocking effect against disturbance due to longitudinal movements of the pipe or conduit sections under stress of expansion and contraction.

From the above description, it will be apparent that the joint arrangement of this invention not only provides a desired durable leak-proof construction, but from the standpoint of production also provides a construction adapted to be quickly and easily formed by any one of a variety of methods, according to the conditions surrounding a given job.

As many changes could be made in the above described construction, and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. A joint of the kind described comprising a bell member and a spigot member, the external diametric dimensions of the free end of said spigot member being substantially equivalent to the internal diametric dimensions of the inner end of said bell member whereby said members are self-centering when mutually engaged, the opposed faces of said bell and spigot members being angularly divergent toward the outer end of said bell member to provide an inwardly tapering joint compound receiving space, said spigot member exceeding in length said bell member to provide an annular intermediate opening communicating with the outer wide end of said compound receiving space, said opposed faces of said bell and spigot members having annular retaining channels therein open to said receiving space, a plastic self-setting compound filling said receiving space and retaining channels, and said opposed bell and spigot faces having a plurality of circumferentially spaced longitudinal inlet channels extending from the mouth opening of said retaining channels.

2. A bell and spigot joint structure for pipe in which the opposed faces of the bell and spigot members are angularly divergent toward the outer end of the bell member to provide an inwardly tapering space to receive a mixture of emulsified asphalt and cement to furnish a sealing compound, the spigot member exceeding in length the bell member to provide an annular intermediate opening communicating with outer wide end of said compound receiving space, the opposed faces of the bell and spigot members having an annular channel open to said receiving space, and said opposed faces of the bell and spigot members having longitudinal inlet channels extending from said annular intermediate opening of said annular channels.

ROBERT BURTNETT.